United States Patent
Suzuki et al.

(10) Patent No.: US 6,768,242 B1
(45) Date of Patent: Jul. 27, 2004

(54) ROTOR STRUCTURE OF INNER ROTOR TYPE MOTOR

(75) Inventors: Yuzuru Suzuki, Shizuoka-ken (JP); Kunitake Matsushita, Shizuoka-ken (JP)

(73) Assignee: Minebea Co., Ltd., Kitasaku-gun (JP)

( * ) Notice: Subject to any disclaimer, the term of this patent is extended or adjusted under 35 U.S.C. 154(b) by 15 days.

(21) Appl. No.: 09/714,547

(22) Filed: Nov. 16, 2000

(30) Foreign Application Priority Data

Nov. 19, 1999 (JP) .......................................... 11-329412

(51) Int. Cl.⁷ ................................................. H02K 1/18
(52) U.S. Cl. ..................................... 310/218; 310/254
(58) Field of Search ................................. 310/42, 49 R, 310/43, 261, 156.08, 156.12, 156.13, 156.14, 156.21, 156.27, 156.29, 156.38, 156.39, 156.44, 156.45, 154.07, 154.21; 29/596–598

(56) References Cited

U.S. PATENT DOCUMENTS

| | | | | |
|---|---|---|---|---|
| 4,227,105 A | * | 10/1980 | Kumakura | 310/156 |
| 4,414,523 A | * | 11/1983 | Pieters | 335/302 |
| 4,591,749 A | * | 5/1986 | Gauthier et al. | 310/156 |
| 4,617,726 A | * | 10/1986 | Denk | 310/156 |
| 4,954,736 A | * | 9/1990 | Kawamoto et al. | 310/156 |
| 5,500,994 A | * | 3/1996 | Itaya | 29/598 |
| 5,574,323 A | * | 11/1996 | Nusser | 310/156 |
| 5,627,423 A | * | 5/1997 | Marioni | 310/156 |
| 5,770,900 A | * | 6/1998 | Sato et al. | 310/49 R |
| 5,828,152 A | * | 10/1998 | Takeda et al. | 310/156 |
| 5,877,578 A | * | 3/1999 | Mitcham et al. | 310/156 |
| 5,881,448 A | * | 3/1999 | Molnar | 29/598 |
| 6,031,304 A | * | 2/2000 | Suzuki et al. | 310/49 R |
| 6,172,438 B1 | * | 1/2001 | Sakamoto | 310/156 |

FOREIGN PATENT DOCUMENTS

JP 2-79753 * 3/1990

* cited by examiner

Primary Examiner—Tran Nguyen
(74) Attorney, Agent, or Firm—Fay, Sharpe, Fagan, Minnich & McKee, LLP

(57) ABSTRACT

There is disclosed a rotor structure of an inner rotor type motor comprising a stator including annular stator yokes each having a plurality of pole teeth along an inner circumference thereof and coils arranged inside the stator yokes, each coil constructed by winding a magnet wire and a rotor rotatably disposed with a small gap from the pole teeth of the annular yokes and having a permanent magnet arranged opposite to the pole teeth. The permanent magnet comprises a plurality of discrete segment magnets, which are arranged apart from each other by resin molding. Thus, the inexpensive inner rotor type motor rotor can be structured by using the magnet having excellent magnetic characteristics.

13 Claims, 5 Drawing Sheets

W1 > W2

W1 > W2

ROTOR STRUCTURE OF INNER ROTOR TYPE MOTOR

BACKGROUND OF THE INVENTION

1. Field of the Invention

The present invention relates to a rotor structure of an inner rotor type motor, and more particularly of an inner rotor type motor using a rare earth magnet.

2. Description of the Prior Art

With higher performance achieved for various OA equipments in recent years, there have been strong demands for a higher output, a higher speed and lower power consumption in various motors including spindle motors, PM (permanent magnet) type stepping motors and others.

To meet such demands, use has been made of a rare earth magnet having a high energy product for a rotor magnet material. However, because of a low mechanical strength of this magnet, if a highly productive resin forming method based on a high polymer material is used as a rotor assembling method, cracks may occur in the magnet due to a forming pressure, making it impossible to maintain the function of the rotor. Under the circumstances, therefore, the only way available is a low-productive method such as adhesion or the like.

FIG. 1A shows an example of a conventional rotor structure using a magnet of the foregoing kind. A sleeve 12 is fitted in around a shaft 3 and, on its periphery, a cylindrical rare earth bond magnet 25 which is reputed to be more inexpensive than a sintered rare earth magnet is arranged in a thinned form to minimize the quantity of its use to a necessary limit whereby the magnet cannot be formed in a larger dimension, and hence is divided into two portions. If this rotor is manufactured by insert molding, two cylindrical rare earth bond magnets 25 and a sleeve 12 are set in a metallic mold and then a resin is injected. However, because of a low mechanical strength of the cylindrical rare earth bond magnet 25, cracks may occur due to an injection pressure, or even breaks may occur depending on molding conditions.

Therefore, an improved rotor structure has been proposed as shown in FIG. 1B. According to the improved structure, a rotor is manufactured in such a way that a cylindrical rare earth bond magnet 25 is beforehand fixed by adhesive K onto the periphery of a metal sleeve 26 serving as a reinforcing material, then is set in a metallic molding die together with a sleeve 12 holding a shaft 3, and the sleeves 12 and 26 are integrated by a resin 27.

The improved rotor structure has enhanced characteristics, but necessity of the adhesion step and the reinforcing sleeve inevitably leads to cost increase, which may limit application of the rotor structure manufactured as such.

SUMMARY OF THE INVENTION

The present invention was made with the foregoing problems in mind, and it is an object of the invention to provide a rotor structure of an inner rotor type motor, which uses a high-performance rare earth magnet but is low in costs.

In order to achieve the foregoing object, in accordance with the invention, there is disclosed a rotor structure of an inner rotor type motor comprising a stator including annular stator yokes each having a plurality of pole teeth along an inner circumference thereof and coils arranged inside the stator yokes, each coil being constructed by winding a magnet wire and a rotor rotatably disposed with a small gap from the pole teeth and having a permanent magnet arranged opposite to the pole teeth, wherein the permanent magnet comprises a plurality of discrete segment magnets which are integrally molded by a resin of a high polymer material and arranged apart from each other.

The permanent magnet used for the rotor comprises a plurality of discrete segment magnets, which are arranged apart from each other like a ring on the outer circumference of the rotor to keep the reduction of a surface area at a minimum limit. The segment magnets are made integral and held in place by filling a space between the segment, magnets with a resin by molding. Thus, portions holding segment magnets serve as a relief for a resin pressure caused by molding, and any cracks or breaks which may be caused in the segment magnet by a molding pressure can be prevented. In addition, reduction of the surface area for entire segment magnets is kept at the minimum limit, so there is no substantial deterioration of a torque as one of characteristics of a motor. Moreover, as the usage of magnets which are of relatively high price is minimized, reduction of cost can also be achieved.

DETAILED DESCRIPTION OF THE PREFERRED EMBODIMENTS

Figure 1A:
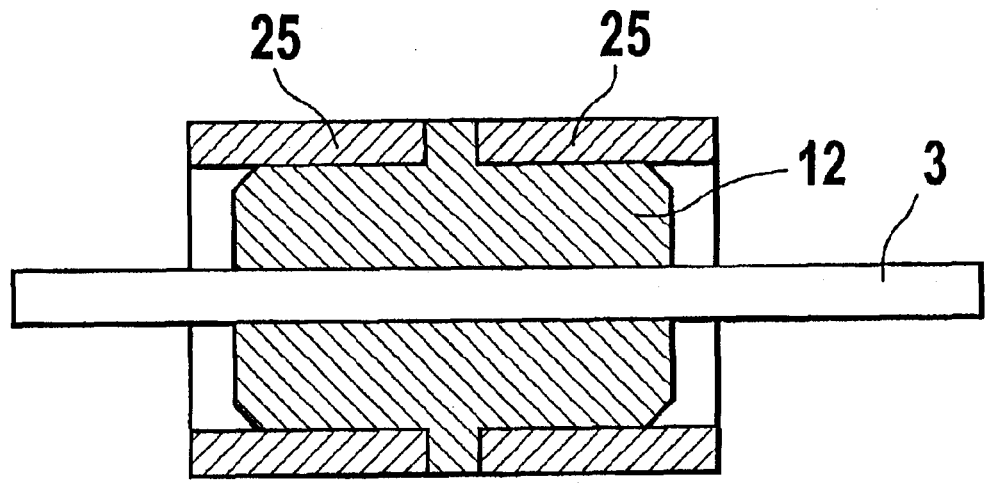
FIGS. 1A and 1B are sectional views showing two different examples of conventional rotor structures.
Figure 1B:
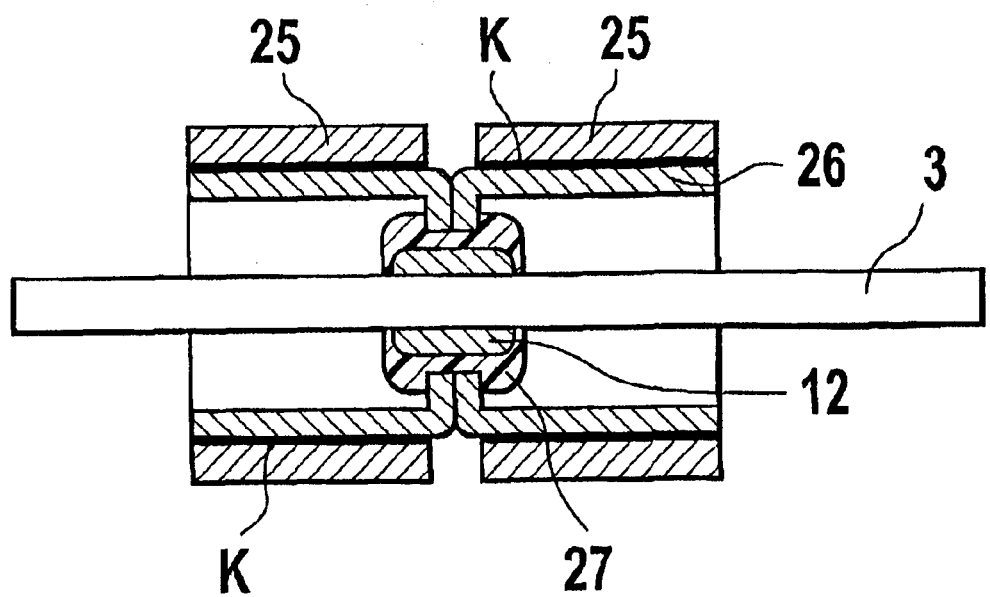
Figure 2:
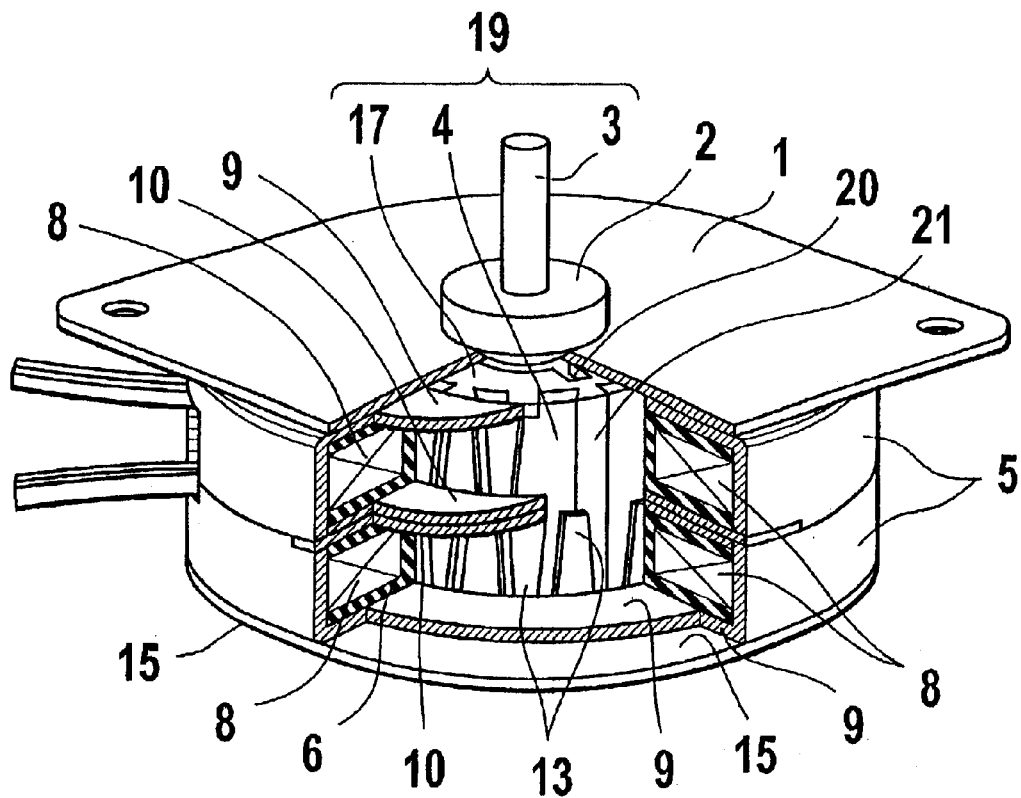
FIG. 2 is a partial cutaway view showing an entire constitution of a permanent magnet (PM) type stepping motor using a rotor structure of the present invention.

FIG. 2 illustrates, in partial cutaway fashion, the entire constitution of a permanent magnet (PM) type stepping motor using a rotor structure of the invention. Reference numerals 1 and 15 denote flanges manufactured by punching stainless steel plates; 2 a bearing made of an oil containing alloy; and 5 a stator assembly including stator yokes 9 and 10 which are made of a soft magnetic material steel plate stereoscopically bent in a doughnut shape and have a plurality of pole teeth 13 formed on its inner circumference, and a coil 8 made by winding a magnet wire on a bobbin 6 which is arranged between the respective stator yokes 9 and 10.

On the other hand, a rotor 19 is located in the center of the stator assembly 5, and constructed in such a manner that a sleeve 12 made of an aluminum material (not shown in FIG. 2, see FIG. 4) is fitted in by pressure almost to the center of a shaft 3 as a rotational center, a holder 17 made of a high polymer material is formed around the sleeve 12 to be united therewith, and a plurality of segment magnets 4 having plural magnetic poles are disposed on the outer circumference of this holder 17 apart from each other at a specified interval to face the pole teeth 13 of the stator yokes 9 and 10.

The holder 17 may be manufactured by integrally insert-molding the sleeve 12 and the plurality of segment magnets 4. Alternatively, the holder 17 may also be manufactured by providing a holding dovetail groove in the fixing position of the segment magnet 4, insert-molding only the sleeve 12, and then inserting and fixing the plurality of segment magnets 4 onto the outer peripheral surface of the holder 17. On the end surface portion of the holder 17, a positioning groove 20 is provided for positioning magnetic poles during magnetization. Needless to mention, such a magnetization positioning means may be configured as a hole or a projection.

Figure 3:
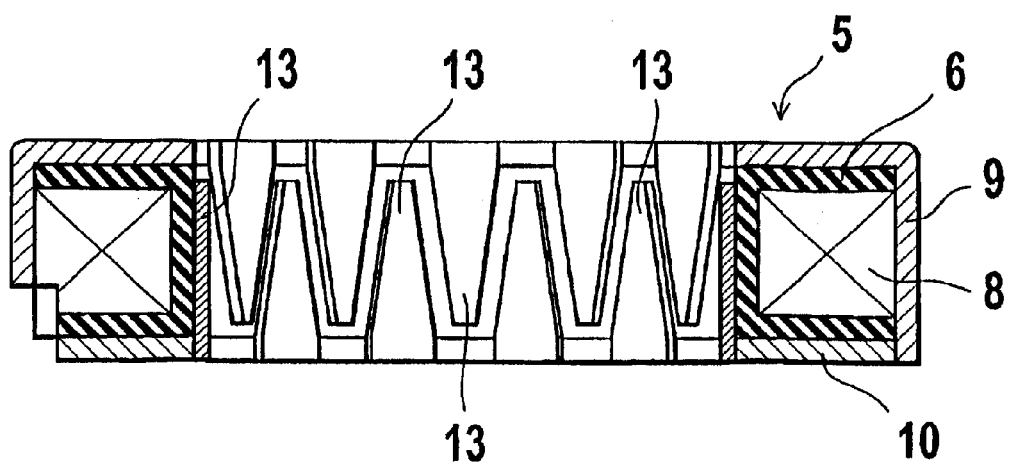
FIG. 3 is a sectional view showing a stator assembly of the motor shown in FIG. 2.

FIG. 3 illustrates in section the constitution of the stator assembly 5.

The doughnut-shaped stator yoke 10 is fitted on its outer periphery with the stator yoke 9 in such a manner that the pole teeth 13 of the former engage with the pole teeth 13 of the latter at equal intervals, and contains therein the coil 8 made by winding the magnet wire on the bobbin 6, thereby constituting the stator assembly 5. Two of such upper and lower stator assemblies 5 are disposed back to back one on another to constitute a stator of the motor.

Figure 4:
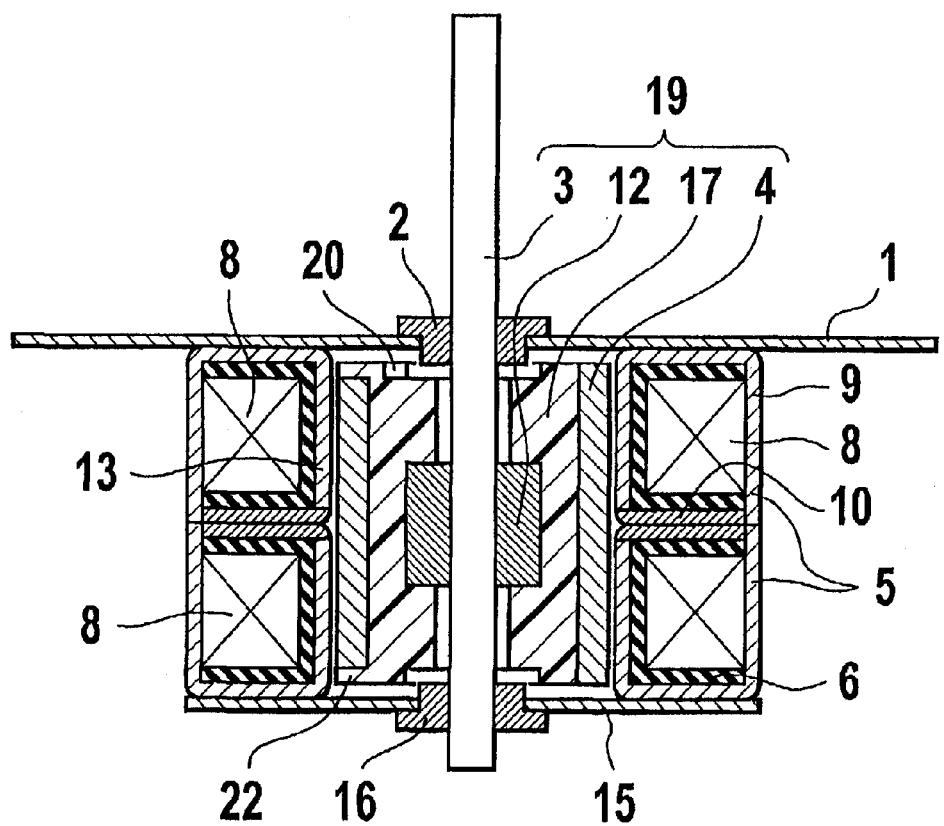
FIG. 4 is a sectional view of the motor shown in FIG. 2.

FIG. 4 illustrates in vertical section a stepping motor of an embodiment of the invention.

The rotor 19 is constructed in such a manner that the shaft 3 is pressed into the sleeve 12 and fixed thereto, and the holder 17 made of a resin is located on the outer circumference of the sleeve 12. On the outer peripheral surface of the holder 17, a plurality of segment magnets 4 are arranged coaxial to and at equi-distance from each other. Regarding the fixing method of the segment magnets 4, as described above, the segment magnets 4 and the sleeve 12 may be subjected to insert molding. Alternatively, the holder 17 and the sleeve 12 may be insert-molded, and the segment magnets 4 may be inserted and fixed in the holding dovetail groove provided for positioning magnet in the outer periphery of the holder 17.

The rotor 19 thus constructed is subjected to magnetization by using the magnetization positioning groove 20 provided in the end surface of the holder 17 as a reference, so that a magnetic pole is formed on each of the plurality of segment magnets 4 by using a magnetizer (not shown). Then the rotor 19 is rotatably held by the bearings 2 and 16 made of oil containing alloys which are arranged in the centers of the flanges 1 and 15 by caulking such that the magnetic pole thus provided can face the pole teeth 13 of the stator assembly 5 a very small distance away from the pole teeth 13 and coaxial to the same.

The flanges 1 and 15 are fixed by a method such as plasma welding or the like so as to set the pole teeth 13 of the stator assembly 5 coaxial to the bearings 2 and 16.

It is necessary to take measures to prevent the segment magnets 4 from pulling out radially or axially of the rotor 19 during high-speed rotation. Some of such measures are shown in FIGS. 5A and 5B and FIGS. 6A to 6F.

Figure 5A:
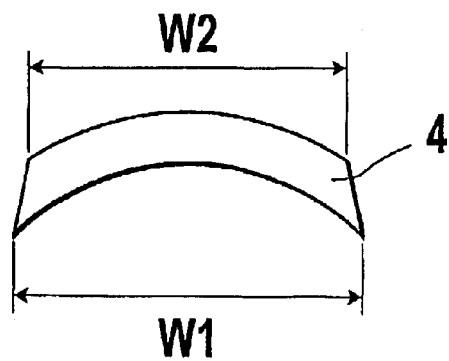
FIGS. 5A and 5B are views showing two different examples of end surface shapes of segment magnets used for a rotor of the invention.
Figure 5B:
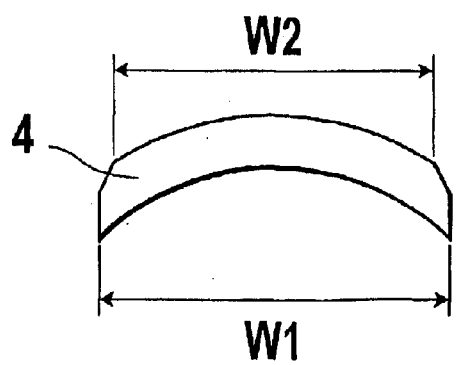

FIGS. 5A and 5B show examples of measures to prevent the pulling-out of the segment magnets 4 in a radial direction of the rotor 19. In case the segment magnets 4 and the sleeve 12 are insert-molded using a high polymer material to be united with each other, an end surface of each segment magnet 4 which is viewed in an axial direction of the rotor 19 is shaped in such a manner that a length W2 of one side edge i.e., an outer circumferential edge of each segment magnet 4 which is located at the outer part of the rotor 19, is shorter than a length W1 of the other side edge i.e., an inner circumferential edge of each segment magnet 4 which is located at the inner part of the rotor 19. In this way, a high polymer material is filled between the adjacent segment magnets during molding, and the radial pulling-out of the segment magnets can be prevented.

Figure 6A:
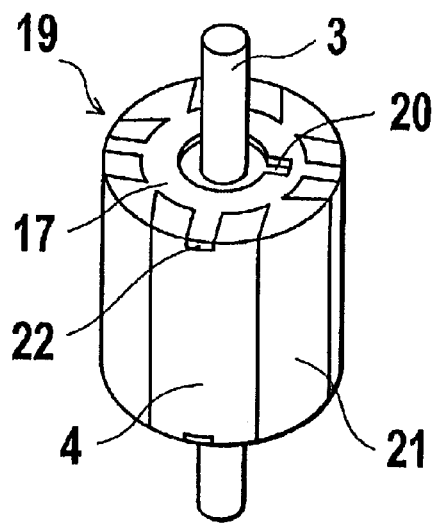
FIGS. 6A to 6F are views showing different examples of measures to prevent axial pulling-out of the segment magnets.

Next, FIGS. 6A to 6F show some examples of measures to prevent the pulling-out of the segment magnets 4 in an axial direction of the rotor 19. A recessed portion 4a is formed substantially in the center of both end surfaces of each segment magnet 4 as shown in FIG. 7. Accordingly, when the segment magnets 4 are fixed to the holder 17 by insert-molding as shown in FIG. 6A, a high polymer material fills the recessed portion 4a of each segment magnet 4 to press both end surfaces thereof. Thus, the axial pulling-out of the segment magnets can be effectively prevented.

Figure 6B:
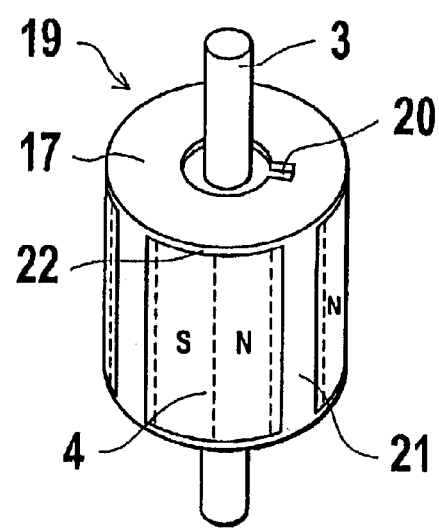
Figure 6C:
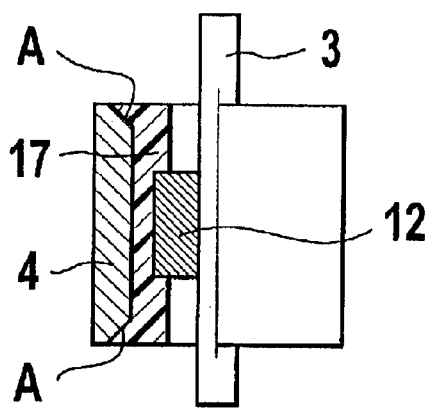
Figure 6D:
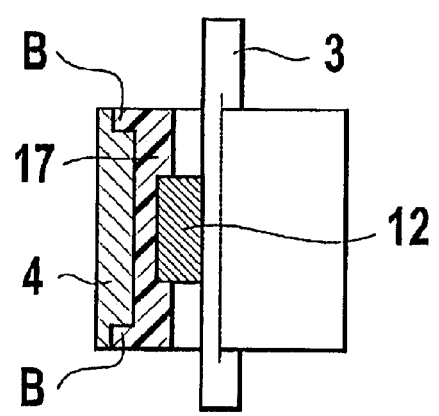
Figure 7:
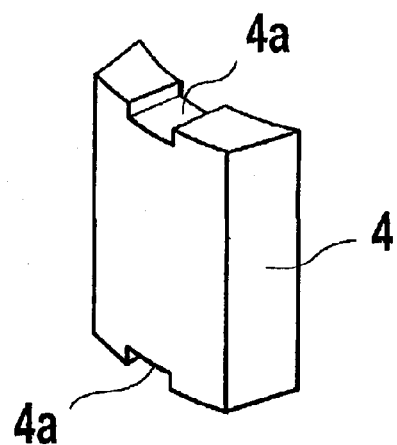
FIG. 7 is a perspective view showing an example of an end surface shape of one segment magnet.

As another measure, as shown in FIG. 6B, rotary flanges 22 may be attached to entire surfaces of both ends of the rotor 19 in the axial direction. Alternatively, as shown by "A" in FIG. 6C, the inner peripheral edge of both end surfaces of each segment magnet 4 may be chamfered. Otherwise, as shown in FIG. 6D, the inner peripheral edge of both end surfaces of each segment magnet 4 may be provided with a stepped portion B. In this way, if insert molding is carried out, a high polymer resin enters the chamfered portion A or the stepped portion B to prevent the axial pulling-out of the segment magnets 4. The chamfered portion A and the stepped portion B may take other shapes.

Figure 6E:
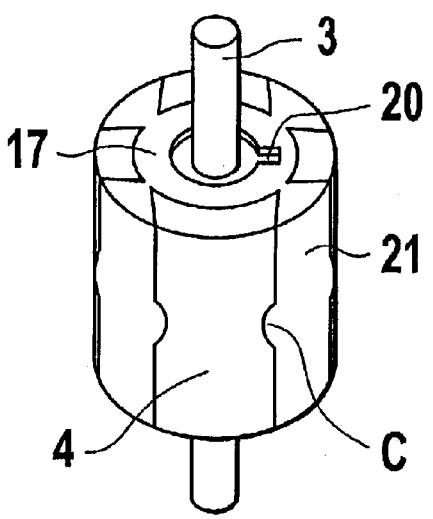
Figure 6F:
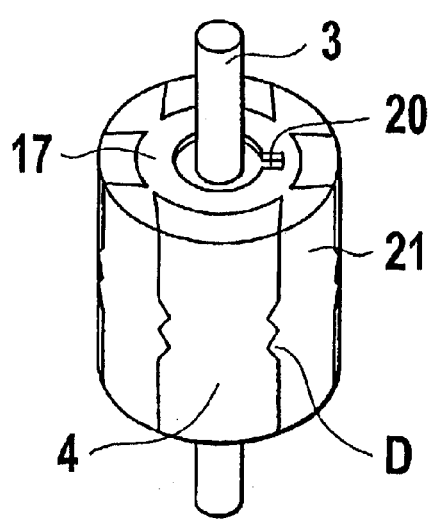

As yet another measure, as shown in FIG. 6E, a concaved portion C may be provided almost in the center between both end surfaces of the segment magnets 4 where a rotor magnet has less magnetic effect with the result that the rotor magnet is of a narrower width at the concaved portion C. In an example shown in FIG. 6F, a serrated portion D is provided on both lateral sides of the segment magnet 4. Various structures and shapes other than the above may be employed for prevention of the axial pulling-out and it is important to install any of these measures in a position where no or least possible effects are caused on motor characteristics.

With the rotor structured in the foregoing manner, no cracks or breaks occur in the magnet with a low tensile strength even if the metallic molding die is subjected to a molding pressure during rotor manufacturing, because no tensile pressure is applied to the magnet. This means that a thickness of the magnet can be ½, or less, of a pitch of a magnetic pole, which is a minimum limit in view of magnetic flux distribution between rotor magnetic poles effective for a motor operation. Therefore, the amount of magnets to be used can be reduced to a minimum limit.

Since the rotor of the present invention includes a plurality of segment magnets disposed apart from each other, a nonmagnetic portion of the resin-made holder is present between the segment magnets. Thus, it is necessary to appropriately position rotor magnets in a magnetizer for magnetizing rotor magnetic poles.

Figure 8A:
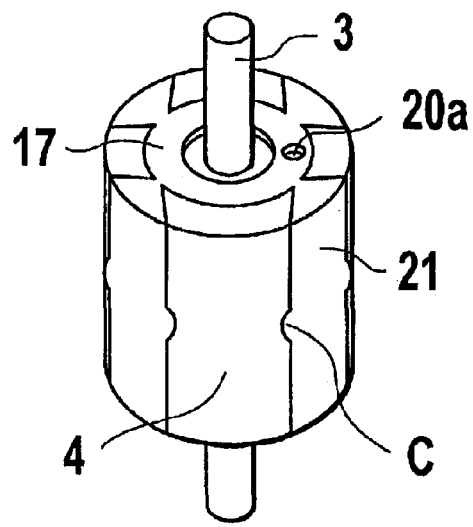
FIGS. 8A and 8B are views showing two different examples of rotor magnetization positioning means of the invention.
Figure 8B:
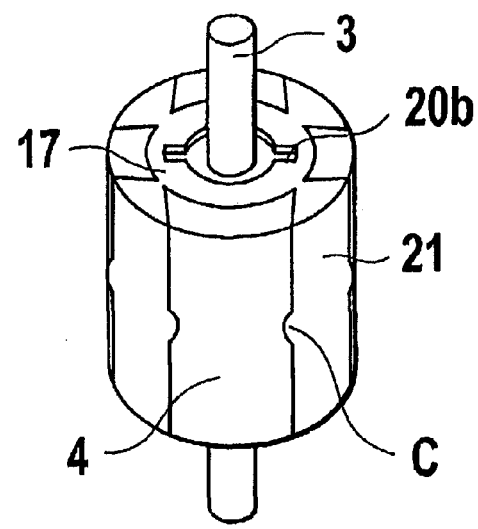

FIG. 8A shows an example of a rotor with a magnetization positioning hole 20a necessary for magnetization provided in the end surface of the holder 17, and FIG. 8B shows an example of a rotor with a magnetization positioning notch 20b provided in the end surface of the holder 17.

The invention has been described with reference to the rotor structure of the inner rotor type motor using the rare earth magnet. However, the invention is applicable to a rotor of an inner rotor type motor using any other cylindrical magnet irrespectively of kinds of magnets and similar effects can be obtained.

According to the present invention, no inconveniences which may grow into serious drawbacks such as magnet cracks or the like occur even if a rotor is manufactured with a magnet having a relatively low mechanical strength, with the result that a high-performance rotor using a rare earth magnet which is particularly excellent in magnetic characteristics can be provided. At the same time, since the amount of magnets to be used, which is small, can be further reduced by thinning of the magnet and adjustment of a width thereof, a low-cost rotor can be provided. Moreover, as it is possible to employ the insert molding in the manufacturing process, a high-performance rotor can be manufactured in a short time.

What is claimed is:

1. A motor structure having an inner rotor assembly, the motor structure comprising:
    a stator including annular stator yokes each having a plurality of pole teeth located along an inner circumference thereof and coils arranged inside said stator yokes, each coil being constructed by winding a magnet wire; and
    a yoke-less rotor rotatably disposed with a small gap from said pole teeth of said annular yokes and having a permanent magnet arranged opposite to said pole teeth,
    wherein said permanent magnet comprises a sleeve fitted to a rotor shaft and a rare earth magnet further comprising a plurality of discrete segment magnets which are arranged apart from each other on an outer surface of the rotor with a thermoplastic material that fills a space between the rotor shaft and each segment magnet and a space between adjacent segment magnets.

2. A motor structure according to claim 1, wherein each of said segment magnets has end surfaces in an axial direction of the rotor, an inner circumferential edge of which end surface is longer than an outer circumferential edge of said end surface.

3. A motor structure according to claim 1, wherein said segment magnet has the end surfaces at least a part of the outer circumferential edge of which is provided with a chamfered portion or a stepped portion.

4. A motor structure according to claim 1, wherein recessed portions are provided on circumferential sides of said segment magnets.

5. A motor structure according to claim 1, wherein magnetization positioning means is provided on an axial end surface of the rotor for positioning magnetization orientation of said segment magnets.

6. A motor structure according to claim 1, wherein said segment magnets comprise a rare earth magnet.

7. A motor structure according to claim 1, wherein a thickness of said segment magnet is set to be equal to or smaller than one half of a rotor magnetic pole pitch.

8. A motor having an inner rotor assembly, the motor comprising:
    a stator including annular stator yokes each having a plurality of pole teeth located along an inner circumference thereof and coils arranged inside said stator yokes, each coil being constructed by winding a magnet wire; and,
    a yoke-less rotor rotatably disposed adjacent said pole teeth of said annular yokes comprising:
        a sleeve fitted to a rotor shaft;
        a thermoplastic holder; and,
        a plurality of discrete rare earth segment magnets arranged opposite said pole teeth which are spaced from each other on an outer surface of the rotor by said thermoplastic holder that fills a space between the rotor shaft and each segment magnet and a space between adjacent segment magnets, the space between adjacent segment magnets providing a relief for a molding pressure of said thermoplastic holder.

9. The motor of claim 8 wherein the motor is a permanent magnet type stepping motor.

10. A method of manufacturing a rotor structure comprising the steps of:
    providing a rotor comprising a stator including annular stator yokes each having a plurality of pole teeth along an inner circumference thereof and coils arranged inside said stator yokes, each coil being constructed by winding a magnet wire and a rotor rotatably disposed adjacent said pole teeth of said annular yokes and having a permanent magnet arranged opposite to said pole teeth, wherein said permanent magnet comprises a plurality of discrete segment magnets;
    insert molding a sleeve of a thermoplastic material;
    pressing a rotary shaft of the rotor into said sleeve; and,
    securing said plurality of segment magnets in said sleeve in a spaced apart manner.

11. The rotor structure according to claim 1, wherein the sleeve comprises an aluminum material.

12. The motor of claim 8, wherein the sleeve comprises an aluminum material.

13. The motor of claim 8, wherein the thermoplastic material fills a space extending radially between the sleeve and each segment magnet and a space extending radially between the rotor shaft and each segment magnet.

* * * * *